Patented Nov. 11, 1930

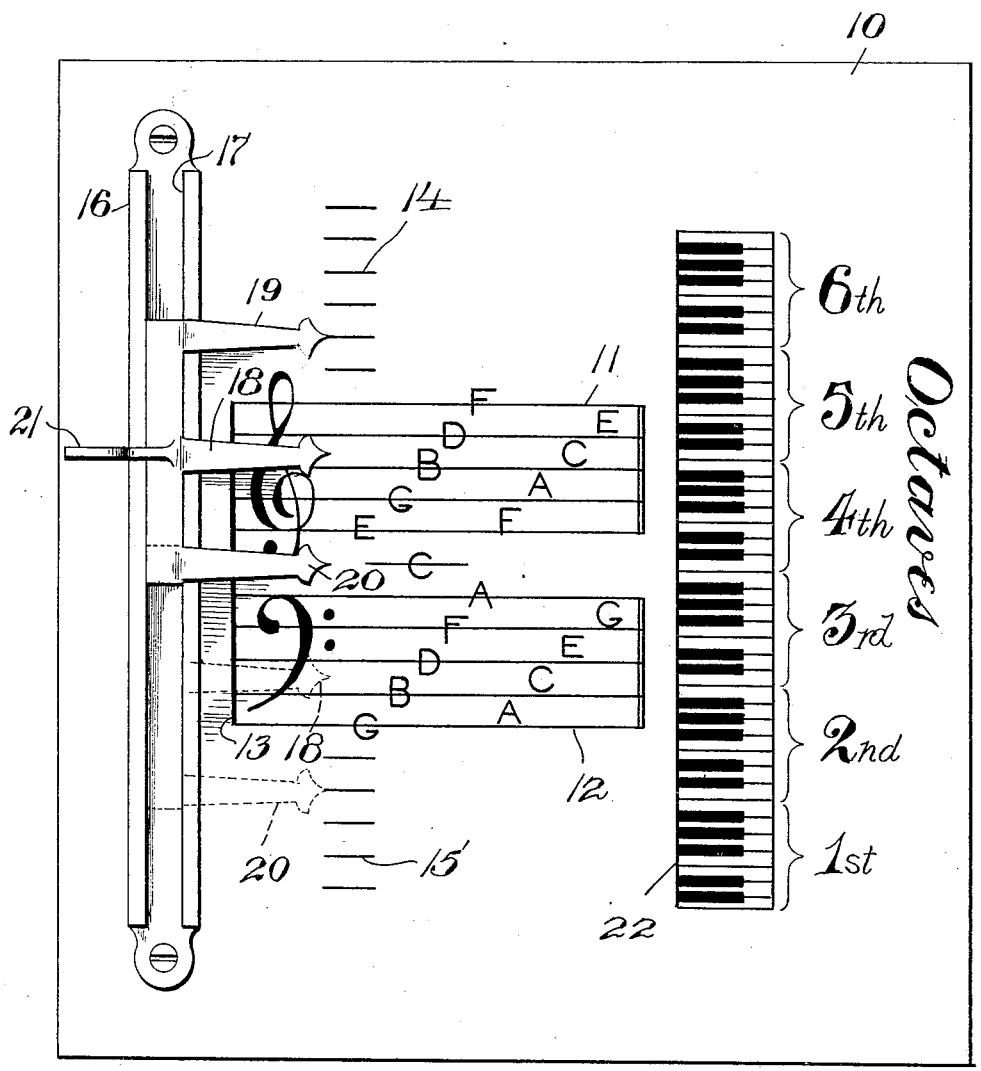

1,780,918

UNITED STATES PATENT OFFICE

HERMAN HOLZMAN, OF NEWARK, NEW JERSEY

MUSICAL-INSTRUCTION DEVICE

Application filed June 21, 1928. Serial No. 237,186.

This invention relates to an improved means for instruction in music and it is designed particularly to assist the teacher in explaining and the pupil in understanding the relationship of the notes on the leger lines and in the spaces between the leger lines.

The invention is also designed to facilitate the instruction of the notes in the clefs and in the leger lines and spaces relative to the keyboard of the piano or the fingerboard of any other instrument.

The invention comprises two connected pointers which are separated by the space of an octave on an illustration of a clef and its leger lines so that when one pointer is used in the clef the other pointer indicates the corresponding note in the next octave.

In this way one pointer is moved along the clef and the other pointer travels along the leger lines so that the note indicated by the leger pointer can be named by reference to the pointer on the clef.

In reading the treble clef the leger pointer would be above the clef pointer and reading the bass clef the pointer would be below the clef pointer. The device can be combined however, for the two clefs and the leger pointers are above and below the central pointer so that the device can be used in both clefs.

The device is usually provided in the form of a card or tablet on which the clefs and the leger lines thereof are printed and the pointers are arranged in a slideway and have a fingerpiece by which they can be moved in unison and for convenience the keyboard or other note selecting means of an instrument can be printed alongside of the clefs to permit easy identification of the note on the chart.

The invention is illustrated in the accompanying drawing in which the figure is a face view of a device embodying my improved music instruction chart with the device shown as being used for identifying a note in the treble clef and above the treble clef in full lines and as used in the bass clef in dotted lines.

The drawing illustrates a suitable support, usually a plain flat tablet or board 10 having the representation of the treble clef as at 11 and of the bass clef as at 12. The clefs are made up of the usual staffs and I usually illustrate both staffs on the chart and connect them by the brace. The leger lines are also properly placed as at 14 above the treble staff and at 15 below the bass staff.

With the chart I use connected pointers which are separated by a distance equal to the space of an octave on the chart and the pointers are therefore used by placing one pointer at a note on the staff and the other pointer will therefor indicate the line or space in the leger area of the corresponding note in the next octave.

For convenience these pointers are preferably placed on the chart itself and mounted so as to slide therein.

I illustrate a guide 16 in which the pointers are mounted, the pointers being usually struck up from a sheet of metal which slides in the space 17 in the guide. The metal piece therefore forms a slide with the pointer 18 to indicate the notes in the staff and the pointer 19 above it to indicate the same leger note. The staff notes are generally provided with a letter to assist in identifying it. To indicate the bass notes in the leger lines I provide the pointer 20 below the pointer 18. A suitable handle 21 can be placed on the slide to make it easy to move the pointers.

In the illustration the pointer 18 points to the note C in the treble staff and the pointer 19 points to the leger position of the C in the next higher octave.

In dotted lines I show the pointer 18 at the C in the bass staff and the pointer 20 at the position of the lower C in the leger area.

I usually place the note space of the instrument to the right of the chart as I show a piano key-board as an illustration. This key-board representation is shown at 22 and the notes can be identified on the key-board as well as on the respective staffs and leger areas by this device.

Various modifications can be made in the device without departing from the scope of the invention.

I claim:

1. A musical instruction chart comprising a representation of a staff and its leger lines, and connected pointer spaced apart the distance of an octave on the chart whereby a leger note can be identified by one pointer when the other pointer is placed on the corresponding note within the staff.

2. A musical instruction chart comprising a representation of a staff and its leger lines, a pair of pointers slidable alongside the staff and separated by the space of an octave on the chart whereby when one pointer indicates a note in the staff the other pointer indicates the same note within the leger area and means on the chart for supporting the pointers.

3. A musical instruction chart comprising a representation of the treble staff and the bass staff and their respective leger lines, and connected pointers slidably arranged on the chart, the centre pointer to indicate the staff notes and the outside pointers to indicate corresponding notes in the leger areas and means for supporting the pointers on the chart.

4. A music instruction chart comprising a representation of the treble staff and the bass staff and their respective leger lines and a set of three equi-distant pointers separated by a space between pointers equal to an octave on the chart.

In testimony whereof I affix my signature.

HERMAN HOLZMAN.